(12) United States Patent
Okayama et al.

(10) Patent No.: US 11,604,360 B2
(45) Date of Patent: Mar. 14, 2023

(54) HEAD-UP DISPLAY

(71) Applicant: Panasonic Intellectual Property Management Co., Ltd., Osaka (JP)

(72) Inventors: Hiroaki Okayama, Nara (JP); Satoshi Kuzuhara, Osaka (JP); Yusuke Nihei, Kanagawa (JP); Koji Taniguchi, Fukuoka (JP); Makoto Funabiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/126,507

(22) Filed: Dec. 18, 2020

(65) Prior Publication Data

US 2021/0103151 A1    Apr. 8, 2021

Related U.S. Application Data

(63) Continuation of application No. PCT/JP2019/031092, filed on Aug. 7, 2019.

(30) Foreign Application Priority Data

Aug. 8, 2018   (JP) .............................. JP2018-149541

(51) Int. Cl.
    *G02B 27/01*    (2006.01)
(52) U.S. Cl.
    CPC ..... *G02B 27/0179* (2013.01); *G02B 27/0101* (2013.01); *G02B 2027/0185* (2013.01); *G02B 2027/0198* (2013.01)
(58) Field of Classification Search
    CPC .............. G02B 27/01; G02B 27/0179; G02B 2027/0185; G02B 2027/0198
    See application file for complete search history.

(56) References Cited

U.S. PATENT DOCUMENTS

2009/0160736 A1    6/2009  Shikita
2016/0134848 A1*   5/2016  Watanabe .............. H04N 9/317
                                                            345/7

(Continued)

FOREIGN PATENT DOCUMENTS

JP          06-115381       4/1994
JP          2009-150947     7/2009

(Continued)

OTHER PUBLICATIONS

English translation of the International Preliminary Report on Patentability dated Feb. 18, 2021 in International Application No. PCT/JP2019/031092.

(Continued)

*Primary Examiner* — Alexander Eisen
*Assistant Examiner* — Cory A Almeida
(74) *Attorney, Agent, or Firm* — Wenderoth, Lind & Ponack, L.L.P.

(57) ABSTRACT

The head-up display includes an imaging position changer configured to change a position of a virtual image between a far visual position far from an observer and a near visual position close to the observer. The imaging position changer inclines the virtual image at the far visual position by a second inclination angle with respect to a perpendicular plane to a reference light beam reaching a center of a viewpoint region in which a viewpoint of the observer is located, to move an upper end thereof in a forward direction of the moving object, and inclines the virtual image at the near visual position by a first inclination angle smaller than the second inclination angle with respect to the perpendicular plane to the reference light beam, to move the upper end in the forward direction of the moving object.

9 Claims, 12 Drawing Sheets

(56) References Cited

U.S. PATENT DOCUMENTS

| | | | |
|---|---|---|---|
| 2017/0092169 A1* | 3/2017 | Kuzuhara | .............. G09G 3/007 |
| 2017/0329143 A1* | 11/2017 | Svarichevsky | ...... G03H 1/2294 |
| 2017/0336628 A1 | 11/2017 | Kim et al. | |
| 2018/0259770 A1* | 9/2018 | Kuzuhara | ............ G03B 21/142 |
| 2018/0356630 A1 | 12/2018 | Masuya | |
| 2018/0356641 A1 | 12/2018 | Morohashi et al. | |
| 2019/0025580 A1* | 1/2019 | Nagano | .............. G02B 27/0149 |
| 2019/0139286 A1 | 5/2019 | Shimoda et al. | |
| 2019/0225083 A1* | 7/2019 | Yatsu | ................ G02B 27/0101 |

FOREIGN PATENT DOCUMENTS

| | | | | |
|---|---|---|---|---|
| JP | 2016-024420 | | 2/2016 | |
| JP | 2016-155505 | | 9/2016 | |
| WO | WO-2010064582 A1 | * | 6/2010 | ............. G02B 27/01 |
| WO | 2017/090464 A1 | | 6/2017 | |
| WO | 2017/094427 | | 6/2017 | |
| WO | 2018/042898 | | 3/2018 | |

OTHER PUBLICATIONS

International Search Report dated Oct. 21, 2019 in International (PCT) Application No. PCT/JP2019/031092 with English translation.

Extended European Search Report dated Sep. 3, 2021 in corresponding European Patent Application No. 19846182.4.

Office Action dated Sep. 27, 2022 issued in corresponding Japanese Patent Application No. 2020-535831, with English Machine Translation, 10 pages.

* cited by examiner

HEAD-UP DISPLAY

CROSS-REFERENCE TO RELATED APPLICATIONS

The present application is a continuation of PCT/JP2019/031092 filed Aug. 7, 2019, which claims priority to Japanese Patent Application No. 2018-149541, filed on Aug. 8, 2018, the entire contents of which are incorporated herein by reference.

TECHNICAL FIELD

The present disclosure relates to a head-up display.

BACKGROUND ART

JP H06-115381 A discloses a head-up display device that changes a position of a virtual image by using a concave mirror as a turning mirror, and changing a distance between a display as an object point and the concave mirror manually or automatically, or both manually and automatically, in a range in which an image point of the virtual image of the concave mirror appears.

JP 2009-150947 A discloses a vehicle head-up display device that includes a light source, a scanning means for making light from the light source two-dimensional, a screen for forming an image of scanning light, and a projecting means for projecting an image on the screen, and changes a position of a projected virtual image between a far focus position far from an observer and a near focus position close to the observer by changing a distance between the projecting means and the screen.

In such conventional head-up displays, in a case where a position of a virtual image is at a far focus position, the virtual image may overlap a road surface depending on the height of a viewpoint position of an observer, a depression angle at which the virtual image is displayed, and a field of view in a vertical direction of the displayed virtual image. In this case, part of the virtual image overlapping the road surface should be hidden by the road surface but is seen to be overlaid on the road surface. This may cause the observer to feel a sense of discomfort.

The present disclosure provides a head-up display capable of preventing an overlap of a virtual image at a far focus position with a road surface.

SUMMARY

A head-up display of the present disclosure is a head-up display installed on a moving object, such as a vehicle, for displaying an image as a virtual image to an observer. The head-up display includes an imaging position changer including a display device configured to display the image and a projection optical system for enlarging and projecting the image, and the imaging position changer being configured to change a position of the virtual image between a far visual position far from the observer and a near visual position close to the observer. The imaging position changer is configured to incline the virtual image at the far visual position by a second inclination angle with respect to a perpendicular plane to a reference light beam reaching a center of a viewpoint region in which a viewpoint of the observer is located, to move an upper end thereof in a forward direction of the moving object, and incline the virtual image at the near visual position by a first inclination angle smaller than the second inclination angle with respect to the perpendicular plane to the reference light beam, to move the upper end in the forward direction of the moving object.

The head-up display according to the present disclosure can provide a head-up display capable of preventing an overlap of a virtual image with a road surface at the time of far focus.

DETAILED DESCRIPTION

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy in the description below and to facilitate understanding of those skilled in the art.

Note that the inventor(s) provide the accompanying drawings and the description below so that those skilled in the art can fully understand the present disclosure, and do not intend to limit the subject matter described in claims by these drawings and description.

First Embodiment

Hereinafter, a first embodiment will be described with reference to FIGS. 1 to 3.

[1-1. Configuration]

[1-1-1. Overall Structure of Head-Up Display]

A specific embodiment and example of a head-up display 100 of the present disclosure will be described below with reference to the drawings.

Figure 1:
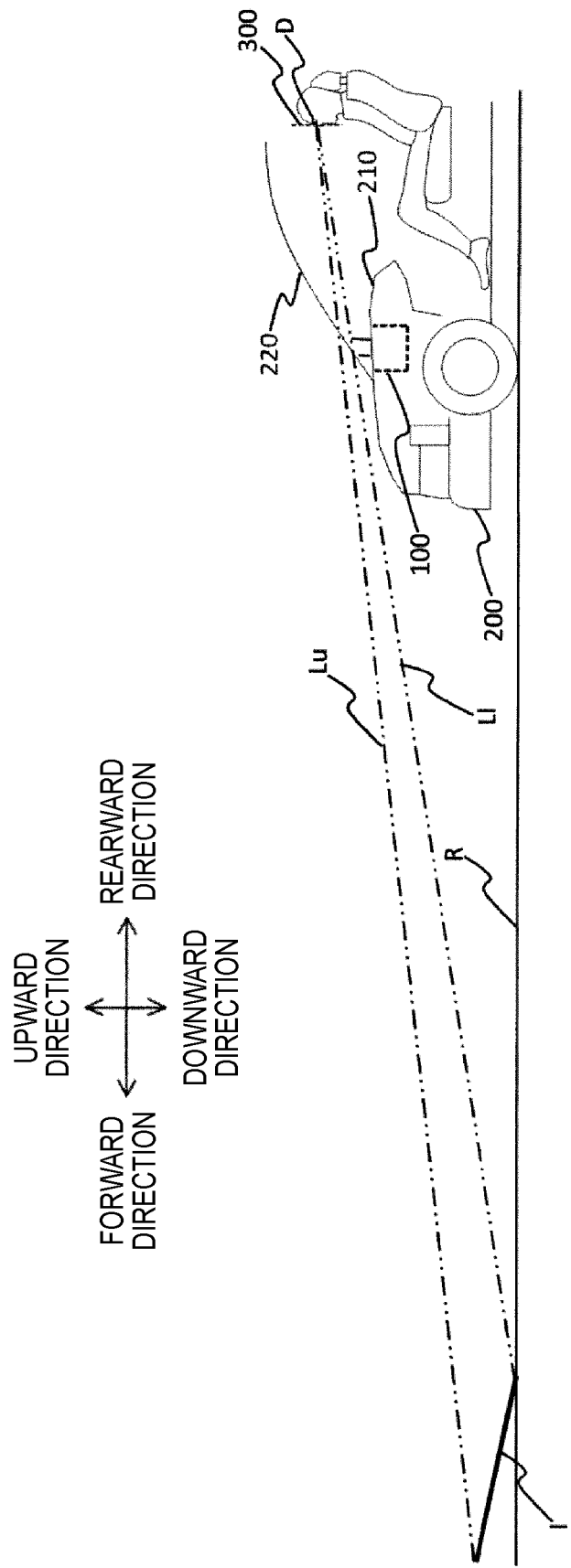
FIG. 1 is a diagram showing a cross section of a vehicle equipped with a head-up display according to a first embodiment.

FIG. 1 is a diagram showing a cross section of a vehicle 200 equipped with the head-up display 100 according to the first embodiment of the present disclosure. As shown in FIG. 1, the head-up display 100 is disposed inside a dashboard 210 below a windshield 220 of the vehicle 200. An observer D perceives an image projected from the head-up display 100 as a virtual image I.

In the present embodiment, a position of the virtual image I is variable between a far focus position located far from the observer D and a near focus position located close to the observer D. The present embodiment inclines the virtual image I to prevent an overlap of the virtual image I with a road surface R which would otherwise occur when the virtual image I is displayed at the far focus position. Therefore, the present embodiment can realize natural augmented reality (AR) display that does not make the observer D feel a sense of discomfort, and it is possible to improve the cognitive ability of a driver (the observer D).

Figure 2:
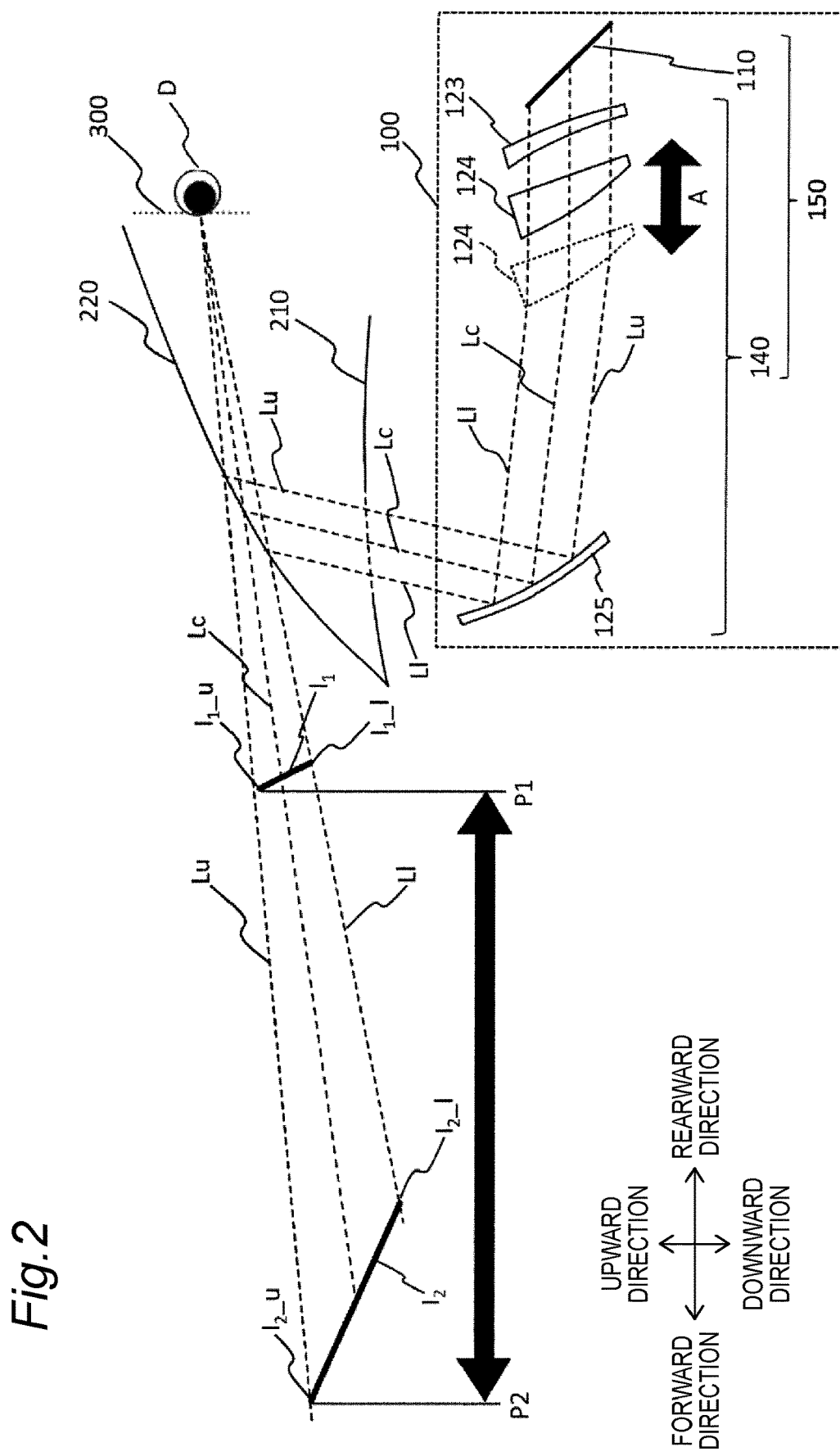
FIG. 2 is a schematic diagram showing a configuration of the head-up display according to the first embodiment.

FIG. 2 is a schematic diagram showing a configuration of the head-up display 100 according to the present embodiment. FIG. 3 is a schematic diagram for explaining a far visual distance and a near visual distance of the head-up display 100 according to the present embodiment.

As shown in FIG. 2, the head-up display 100 includes an imaging position changer 150 including a display device 110 and a projection optical system 140. In the head-up display 100, the display device 110 is an optical member having a diffusion characteristic, and the head-up display 100 projects an image displayed on the display device 110 onto a windshield 220 via the projection optical system 140. Projected light is reflected by the windshield 220 and guided to a viewpoint region 300 of the observer D. In this manner, the head-up display 100 allows the observer D to visually perceive a virtual image $I_1$ at a near visual position (near focus position) P1 and a virtual image $I_2$ at a far visual position (far focus position) P2. The head-up display 100 in the present embodiment has a variable focus function of moving a position of the virtual image between the near visual position P1 and the far visual position P2. Here, a viewpoint is a principle point of an eye of the observer D in a case where the eye is considered as a lens, and the viewpoint region 300 is a region where the viewpoint of the observer D which allows the observer D to visually perceive the virtual images $I_1$ and $I_2$ completely is positioned.

As shown in FIG. 2, among light beams emitted from the display device 110 and among light beams reaching a center of the viewpoint region 300, a light beam corresponding to an upper end $I_1\_u$ of the virtual image $I_1$ and an upper end $I_2\_u$ of the virtual image $I_2$ is defined as an upper light beam Lu, and a light beam corresponding to a lower end $I_1\_l$ of the virtual image $I_1$ and a lower end $I_2\_l$ of the virtual image $I_2$ is defined as a lower light beam L1. Further, among light beams emitted from the display device 110, a light beam that passes through a central portion of the virtual images $I_1$ and $I_2$ and reaches the center of the viewpoint region 300 is defined as a reference light beam Lc. That is, when viewed from the observer D, the reference light beam Lc corresponds to an optical path from a center of the virtual images $I_1$ and $I_2$ to the viewpoint of the observer D. Actually, the reference light beam Lc visually perceived by the observer D is a light beam that reaches the observer D from the display device 110 via the optical system. For this reason, light beams that reaches the observer D from the display device 110 and correspond to the reference light beam Lc emitted from the centers of the virtual images $I_1$ and $I_2$ each are also expressed as the reference light beam Lc. Further, optical paths corresponding to these light beams are similarly expressed as the reference light beam Lc. However, it is assumed that the viewpoint of the observer D is at the center of the viewpoint region 300.

Here, in the present disclosure, a forward direction is a direction from the observer D toward the windshield 220 of the vehicle 200. A rearward direction is an opposite direction from the forward direction. A downward direction is a direction from the vehicle 200 toward a ground on which the vehicle 200 travels. An upward direction is an opposite direction from the downward direction.

The display device 110 displays a display image under the control of a control unit such as a CPU (not shown). As the display device 110, for example, a liquid crystal display device with a backlight, an organic light-emitting diode, a plasma display, or the like can be used. Further, as the display device 110, a screen that diffuses or reflects light and a projector or a scanning laser may be used to generate an image. The display device 110 can display various pieces of information such as road progress guidance display, a distance to a vehicle in front, a remaining amount of a vehicle battery, and a current vehicle speed. Further, the display device 110 can electronically distort an image in advance according to the distortion generated in the projection optical system 140 or the windshield 220 or the position of the observer D acquired by a camera (not shown), so as to allow the observer D to visually perceive the excellent virtual images I1 and I2. Further, the display device 110 can display displayed pixels of a plurality of wavelengths as if the displayed pixels are shifted depending on their respective display positions in advance according to the chromatic aberration generated in the projection optical system 140, so as to allow the observer D to visually perceive the excellent virtual images I1 and I2.

The projection optical system 140 includes a first lens 123, a second lens 124, and a first mirror 125 as optical elements. The first lens 123 and the second lens 124 are free-form surface lenses as an example, and the first mirror 125 is a free-form surface mirror as an example. The projection optical system 140 projects an image enlarged by the first lens 123 and the second lens 124 onto the windshield 220 by reflecting the image on the first mirror 125.

Further, the second lens 124 is configured to be movable in directions of arrows A between a position close to the first lens 123 as shown by a solid line in FIG. 2 and a position far from the first lens 123 as shown by a dotted line in FIG. 2. In a case where the second lens 124 is far from the first lens 123, the virtual image $I_1$ is formed at the near visual position P1. In a case where the second lens 124 is at the position close to the first lens 123, the virtual image $I_2$ is formed at the far visual position P2. As described above, in the present embodiment, the second lens 124 of the projection optical system 140 is configured to be movable, thereby enabling changing an imaging position.

[1-1-2. Configuration of Imaging Position Changer]

The head-up display 100 projects the virtual images $I_1$ and $I_2$ on the windshield 220, thereby superimposing the virtual images $I_1$ and $I_2$ on actual scenery in front of the vehicle 200. Therefore the observer D, who is a driver, can confirm a route guidance, a warning, and the like without significantly moving the line of sight and the focus adjustment of the eyes, and safety during driving can be improved.

However, the virtual image $I_2$ at the far visual position P2 may overlap the road surface R, and may result in an unnatural expression by which the observer D feels a sense of discomfort. In view of the above, in the present embodiment, the virtual images $I_1$ and $I_2$ are configured to be displayed so as to be inclined with respect to the line of sight of the observer D. In order to display the virtual images $I_1$ and $I_2$ in an inclined manner as described above, the display device 110 is disposed to be inclined by a prescribed angle in a counterclockwise direction with respect to the reference light beam Lc, as shown in FIG. 2.

Further, at the time of high speed traveling, a distance between vehicles is relatively long and the observer D drives the vehicle by looking at a distant place. Therefore, in this case, a visual distance to the virtual image is made long, so that the visual distance adjustment of the eye can be reduced and the visibility is improved. On the other hand, at the time of low speed traveling, a distance from a vehicle in front is short and the observer D drives the vehicle by looking at the front while paying attention to the vehicle in front. Therefore, in this case, the visual distance to the virtual image is made short, so that the visual distance adjustment of the eye is reduced and the visibility is improved. Further, by making the distance of the virtual image less than the distance to the vehicle in front, it is possible to reduce a sense of discomfort.

In view of the above, in the present embodiment, as described above, the second lens 124 of the projection optical system 140 included in the imaging position changer 150 is configured to be movable, and the imaging position of the virtual image can be changed between the near visual position P1 having a short visual distance which is an imaging position of the virtual image $I_1$ and the far visual position P2 having a long visual distance which is an imaging position of the virtual image $I_2$.

Figure 3:
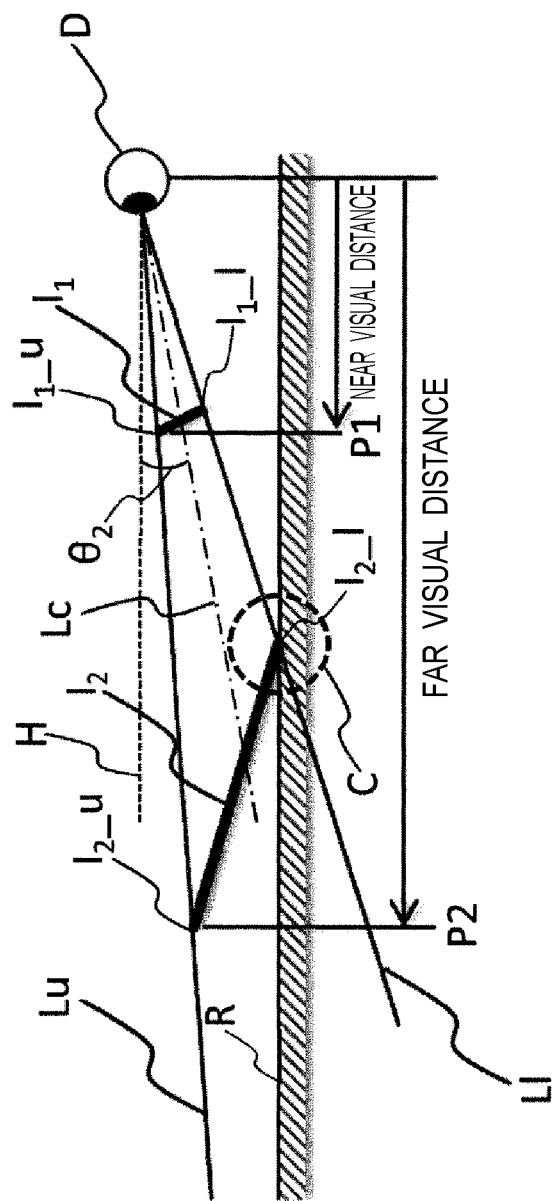
FIG. 3 is a schematic diagram for explaining a far visual distance and a near visual distance of the head-up display according to the first embodiment.

Further, in the present embodiment, the projection optical system 140 included in the imaging position changer 150 is set so that the lower end $I_2\_l$ of the virtual image $I_2$ at the far visual position P2 is positioned at a position equal to or higher than a position of the road surface R as indicated by a dotted circle C in FIG. 3 when a height of the viewpoint position of the observer D with respect to the road surface R is a predetermined height and a depression angle is a predetermined angle. Further, similarly, the projection optical system 140 is set so that the upper end $I_2\_u$ of the virtual image $I_2$ at the far visual position P2 is positioned at a position where a height of the upper end $I_2\_u$ of the virtual image $I_2$ from the road surface R is higher than a height of the lower end $I_2\_l$ of the virtual image $I_2$ from the road surface R when the height of the viewpoint position of the observer D with respect to the road surface R is the predetermined height and the depression angle is the predetermined angle.

Note that the lower end $I_2\_l$ of the virtual image $I_2$ does not have to be positioned at the position equal to or higher than the position of the road surface R, and there is no problem if the lower end $I_2\_l$ of the virtual image $I_2$ is at a position slightly lower than the road surface R as long as a lower end of a main portion of the virtual image $I_2$ is at the position equal to or higher than the position of the road surface R. In this case, the "main portion" of the virtual image $I_2$ means a portion by which the meaning and content of a sign or the like shown by the virtual image $I_2$, such as a direction of a turn-by-turn arrow shown by the virtual image $I_2$, can be confirmed.

The viewpoint position of the observer D in the vehicle 200 varies depending on the type of the vehicle 200, the height of the observer D, and the like. In the present embodiment, for example, the predetermined height of the viewpoint position is set to 1.2 m which corresponds to a height of a line-of-sight position of the driver. However, this is an example, and other numerical values may be used as the predetermined height of the viewpoint position.

Further, the depression angle $\theta_2$ which is an angle of the reference light beam Lc with respect to a horizontal direction H of the vehicle 200 from the viewpoint position of the observer D also varies depending on the height of the observer D and the like. In the present embodiment, for example, the predetermined angle of the depression angle $\theta_2$ is set to 3° to 4°. However, this is an example, and other numerical values may be used as the predetermined angle of the depression angle $\theta_2$.

Further, in the present embodiment, a field angle is set so that an angle from the reference light beam Lc to the upper light beam Lu and the lower light beam L1 is 1.5°. However, this is an example, and other numerical values may be used as the field angle.

In the present embodiment, as an example, the virtual image $I_1$ is inclined so that a near visual distance of the lower end $I_1\_l$ of the virtual image $I_1$ at the near visual position P1 from the observer D is 5 m, and a near visual distance of the upper end $I_1\_u$ of the virtual image $I_1$ at the near visual position P1 from the observer D is 6 m.

Further, in the present embodiment, as an example, the virtual image $I_2$ is inclined so that a far visual distance of the lower end $I_2\_l$ of the virtual image $I_2$ at the far visual position P2 from the observer D is 10 m, and a far visual distance of the upper end $I_2\_u$ of the virtual image $I_2$ at the far visual position P2 from the observer D is 15 m.

As described above, according to the present embodiment, the projection optical system 140 is set to allow the lower end $I_2\_l$ of the virtual image $I_2$ at the far visual position P2 to be positioned at a position of an intersection of the road surface R and the lower light beam L1 when the height of the viewpoint position of the observer D with respect to the road surface R is the predetermined height, and the depression angle is the predetermined angle. As a result, it is possible to prevent an overlap of the virtual image $I_2$ at the far visual position P2 with the road surface R, and prevent the observer D from feeling a sense of discomfort.

Further, according to the present embodiment, the projection optical system 140 is set to allow the upper end $I_2\_u$ of the virtual image $I_2$ at the far visual position P2 to be positioned at a position higher than an intersection of the road surface R and the upper light beam Lu when the height of the viewpoint position of the observer D with respect to the road surface R is the predetermined height, and the depression angle is the predetermined angle. As a result, the upper end $I_2\_u$ of the virtual image $I_2$ does not become lower than the lower end $I_2\_l$, and it is possible to prevent the observer D from feeling a sense of discomfort.

In the present embodiment, a movement amount of the second lens 124 can be reduced by setting the projection optical system 140 as described above. Hereinafter, a relationship between a visual distance and a movement amount of a lens will be described.

Figure 4:
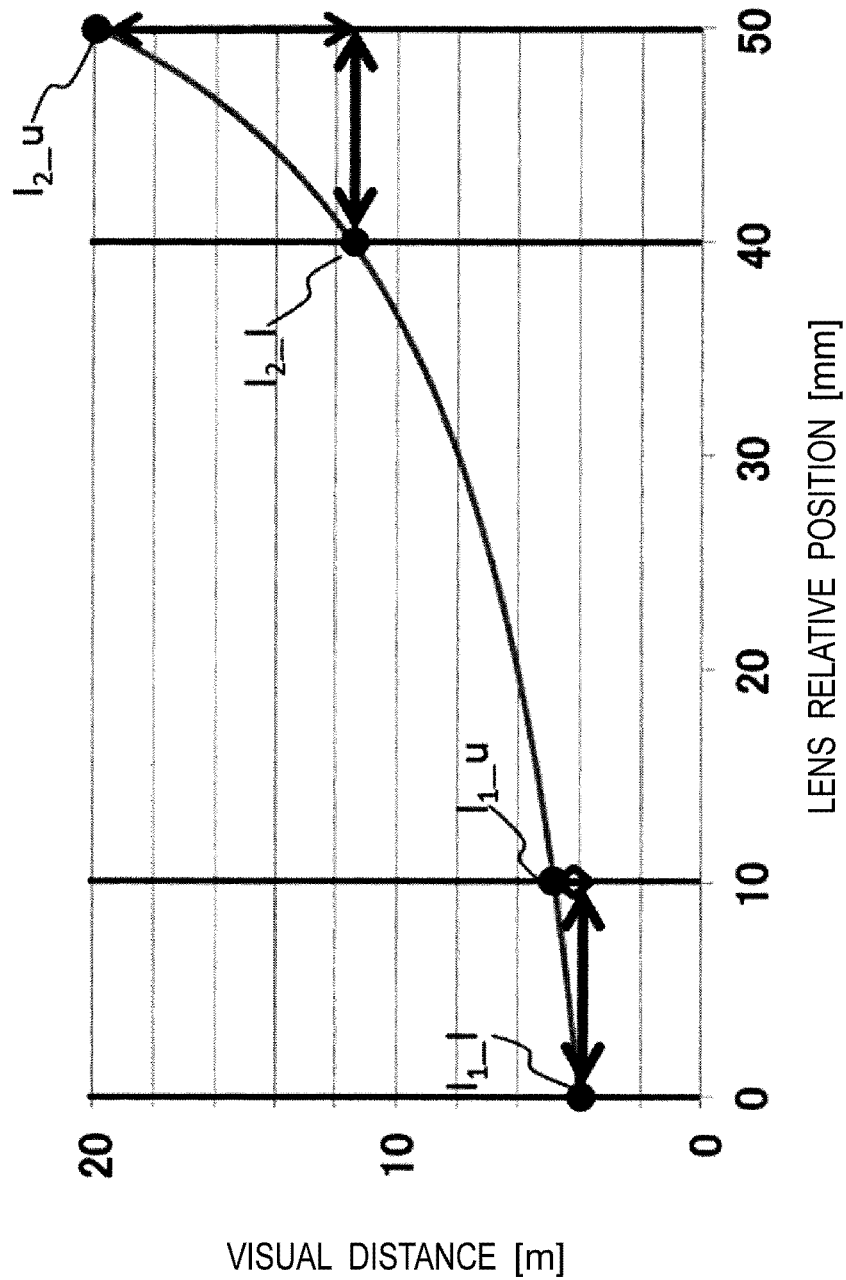
FIG. 4 is a graph showing a change in a visual distance with respect to a relative position of a second lens with respect to a display device.

FIG. 4 is a graph showing a change in a visual distance with respect to a relative position of the second lens 124 with respect to the display device 110. As shown in FIG. 4, a visual distance change amount per unit movement amount of the second lens 124 becomes larger as a visual distance becomes longer. For example, in a case where a virtual image which is perpendicular to the road surface R as in the conventional case and has a visual distance of 4 m from the observer D is considered, when the second lens 124 is moved by 10 mm, from a position (0 mm) at the time point to 10 mm, a visual distance to the virtual image changes from 4 m to 5 m, and a visual distance change amount is 1 m.

Next, in a case where a virtual image which is perpendicular to the road surface R as in the conventional case and has a visual distance of around 12 m from the observer D is considered, when the second lens 124 is moved by 10 mm, from a position (40 mm) at the time point to 50 mm, a visual distance to the virtual image changes from around 12 m to 20 m, and a visual distance change amount is 8 m.

That is, in the case of a virtual image perpendicular to the road surface R as in the conventional case, in order to display the virtual image at a far visual distance of 20 m with respect to the observer D from a state in which the virtual image is displayed at a near visual distance of 4 m with respect to the observer D, the second lens 124 needs to be moved by 50 mm, from 0 mm to 50 mm.

However, as shown in FIG. 4, in a case where the virtual image $I_1$ is inclined so that the lower end $I_1\_l$ of the virtual image $I_1$ is displayed at the position of 4 m and the upper end $I_1\_u$ of the virtual image $I_1$ is displayed at the position of 5 m, the movement amount of the second lens 124 is decreased. That is, in a case where the virtual image $I_1$ is inclined as shown in FIG. 3, by moving the second lens 124 by 40 mm, from 0 mm to 40 mm, the lower end $I_2\_l$ of the virtual image $I_2$ is displayed at a position of about 12 m, and the upper end $I_2\_u$ of the virtual image $I_2$ is displayed at a position of 20 m.

In a case where the second lens 124 is fixed and the display device 110 is movable, the relationship between the visual distance and the movement amount of the lens as described above can be replaced with a relationship between the visual distance and a movement amount of the display device 110.

As described above, the projection optical system 140 of the head-up display 100 in the present embodiment is set so that the lower end $I_2\_l$ of the virtual image $I_2$ or the lower end of the main portion of the virtual image $I_2$ at the far visual position P2 is located at the position equal to or higher than the position of the road surface R. Accordingly, it is possible to prevent an overlap of the virtual image $I_2$ at the far visual position P2 with the road surface R and prevent the observer D from feeling a sense of discomfort.

Further, the projection optical system 140 of the head-up display 100 in the present embodiment is set so that the upper end $I_2\_u$ of the virtual image $I_2$ at the far visual position P2 is located at a position where the height of the upper end $I_2\_u$ from the road surface R is higher than the height of the lower end $I_2\_l$ from the road surface R when the height of the viewpoint position of the observer D with respect to the road surface R is the predetermined height and the depression angle is the predetermined angle. Accordingly, the upper end $I_2\_u$ of the virtual image $I_2$ is not lower than the lower end $I_2\_l$, and it is possible to prevent the observer D from feeling a sense of discomfort.

Furthermore, the projection optical system 140 of the head-up display 100 in the present embodiment inclines the virtual images $I_1$ and $I_2$ as described above to reduce the movement amount of the second lens 124. Therefore, a load on a lens driving mechanism can be reduced.

[1-2. Advantageous Effect and the Like]

The head-up display 100 as an example of the head-up display according to the first embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, in the head-up display 100 as an example of the head-up display according to the first embodiment, the projection optical system 140 includes the first lens 123 and the second lens 124 as a plurality of optical elements. A light beam corresponding to the centers of the virtual images $I_1$ and $I_2$ is the reference light beam Lc. The imaging position changer 150 is configured to change the positions of the virtual images $I_1$ and $I_2$ by changing a distance in a direction of the reference light beam Lc of at least any one of the first lens 123 and the second lens 124, e.g., the second lens 124 to the first lens 123.

According to the head-up display 100 of the first embodiment, it is possible to prevent an overlap to the virtual image $I_2$ at the far visual position P2 with the road surface R and prevent the observer D from feeling a sense of discomfort. Further, according to the head-up display 100 of the first embodiment, the upper end $I_2\_u$ of the virtual image $I_2$ does not become lower than the lower end $I_2\_l$, and it is possible to prevent the observer D from feeling a sense of discomfort. Furthermore, according to the head-up display 100 of the first embodiment, it is possible to reduce the movement amount of the second lens 124 and reduce the load on the lens driving mechanism.

Second Embodiment

Next, a second embodiment will be described with reference to FIG. 5.

[2-1. Configuration]

Figure 5:
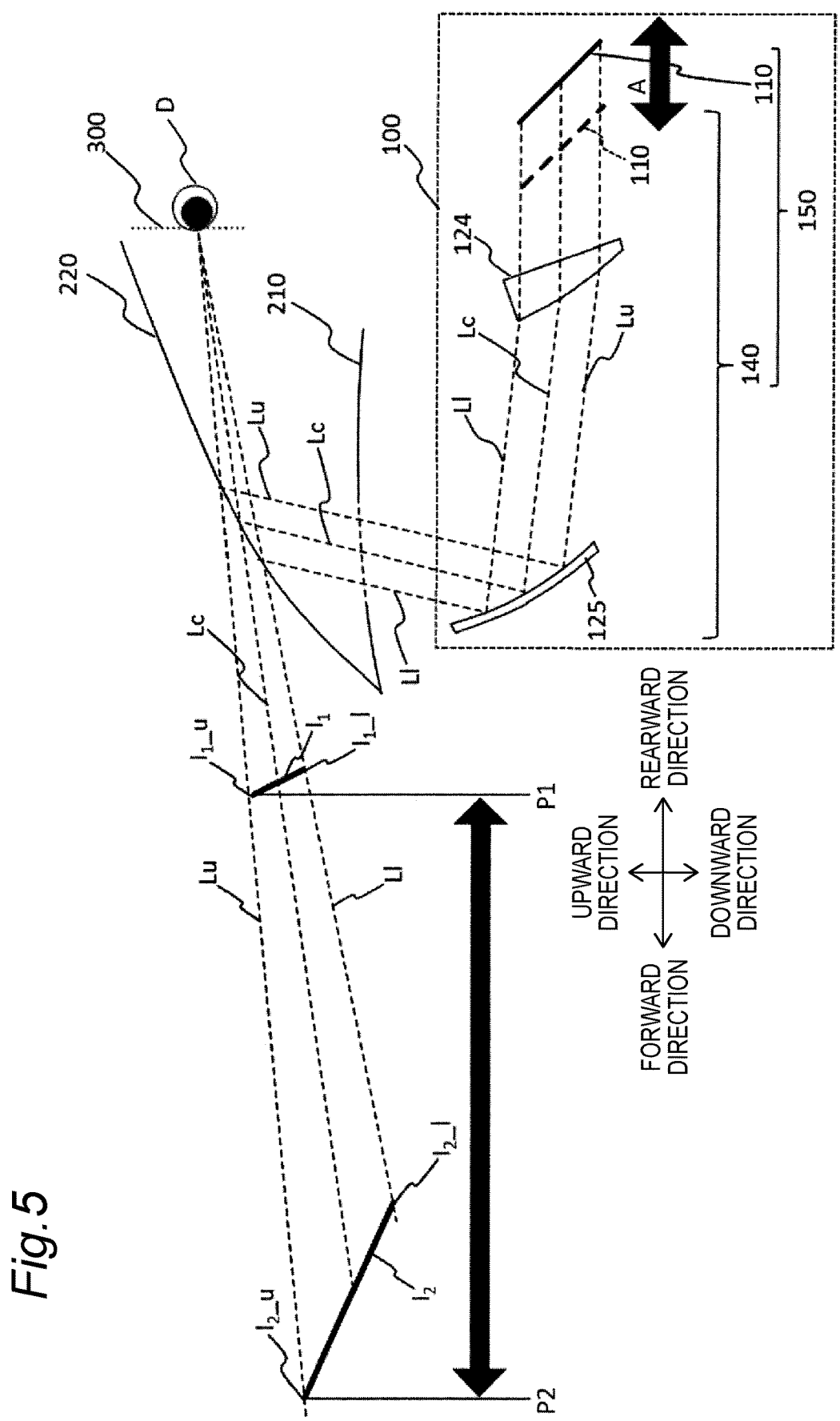
FIG. 5 is a schematic diagram showing a configuration of a head-up display according to a second embodiment.

FIG. 5 is a schematic diagram showing the configuration of the head-up display 100 according to the second embodiment. As shown in FIG. 5, in the head-up display 100 of the present embodiment, the display device 110 included in the imaging position changer 150 is configured to be movable in directions of arrows A between a position close to the second lens 124 as shown by a dotted line in FIG. 5 and to a position far from the second lens 124 as shown by a solid line in FIG. 5. In a case where the display device 110 is at the position close to the second lens 124, the virtual image $I_1$ is formed at the near visual position P1, and in a case where the display device 110 is at the position far from the second lens 124, the virtual image I$_2$ is formed at the far visual position P2. As described above, in the present embodiment, the display device 110 is configured to be movable, thereby enabling changing the imaging position.

Also the present embodiment is configured so that the virtual images I$_1$ and I$_2$ are displayed so as to be inclined with respect to the line of sight of the observer D. In order to display the virtual images I$_1$ and I$_2$ in an inclined manner as described above, the display device 110 is disposed to be inclined by the prescribed angle in the counterclockwise direction with respect to the reference light beam Lc, as shown in FIG. 5.

Further, also in the present embodiment, the projection optical system 140 included in the imaging position changer 150 is set so that the lower end of the main portion of the virtual image I$_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end I$_2$_u of the virtual image I$_2$ at the far visual position P2 is located at the position where the height of the upper end I$_2$_u from the road surface R is higher than the height of the lower end I$_2$_l from the road surface R when the height of the viewpoint position of the observer D with respect to the road surface R is the predetermined height and the depression angle is the predetermined angle.

Therefore, according to the present embodiment, it is possible to prevent an overlap of the virtual image I$_2$ at the far visual position P2 with the road surface R, and prevent the observer D from feeling a sense of discomfort. Further, according to the present embodiment, the upper end I$_2$_u of the virtual image I$_2$ does not become lower than the lower end I$_2$_l, and it is possible to prevent the observer D from feeling a sense of discomfort.

[2-2. Advantageous Effect and the Like]

The head-up display 100 as an example of the head-up display according to the second embodiment is a head-up display for allowing the observer D to visually perceive the virtual images I$_1$ and I$_2$. The virtual images I$_1$ and I$_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image I$_2$ at the far visual position P2 to be located at the position equal to or higher than the position of the road surface R, and allow the upper end I$_2$_u of the virtual image I$_2$ at the far visual position P2 to be located at the position where the height of the upper end I$_2$_u from the road surface R is higher than the height of the lower end I$_2$_l from the road surface R.

Further, in the head-up display 100 as an example of the head-up display according to the second embodiment, a light beam corresponding to the centers of the virtual images I$_1$, I$_2$ is the reference light beam Lc. The imaging position changer 150 is configured to change the positions of the virtual images I$_1$ and I$_2$ by changing a distance in the direction of the reference light beam Lc of the display device 110 with respect to the projection optical system 140.

According to the head-up display of the second embodiment, it is possible to prevent an overlap of the virtual image I$_2$ at the far visual position P2 with the road surface R, and prevent the observer D from feeling a sense of discomfort. Further, according to the head-up display 100 of the second embodiment, the upper end I$_2$_u of the virtual image I$_2$ does not become lower than the lower end I$_2$_l, and it is possible to prevent the observer D from feeling a sense of discomfort.

Third Embodiment

Next, a third embodiment will be described with reference to FIG. 6.

[3-1. Configuration]

Figure 6:
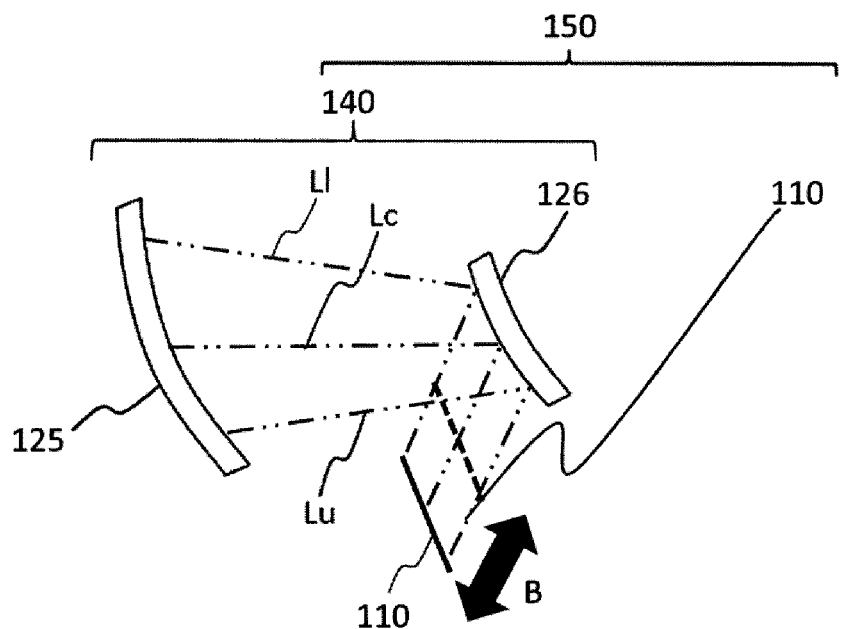
FIG. 6 is a schematic diagram showing a configuration of an imaging position changer in a head-up display according to a third embodiment.

FIG. 6 is a schematic diagram showing a configuration of the imaging position changer 150 in the head-up display 100 according to the third embodiment. As shown in FIG. 6, in the head-up display 100 of the present embodiment, the projection optical system 140 included in the imaging position changer 150 includes a second mirror 126 provided in place of the second lens 124 described in the second embodiment and the first mirror 125. The first mirror 125 and the second mirror 126 are, for example, free-form surface mirrors. The projection optical system 140 projects an image enlarged by the second mirror 126 onto the windshield 220 by reflecting the image on the first mirror 125.

In the present embodiment, the display device 110 is positioned more forward of the vehicle 200 than the second mirror 126 is, as shown in FIG. 6. Further, the display device 110 is configured, as in the second embodiment, to be movable in directions of arrows B between a position close to the second mirror 126 as shown by a dotted line in FIG. 6, and a position far from the second mirror 126 as shown by a solid line in FIG. 6. In a case where the display device 110 is in the position close to the second mirror 126, the virtual image I$_1$ is formed at the near visual position P1, and in a case where the display device 110 is at the position far from the second mirror 126, the virtual image I$_2$ is formed at the far visual position P2. As described above, in the present embodiment, the display device 110 is configured to be movable, thereby enabling changing the imaging position.

Also the present embodiment is configured so that the virtual images I$_1$ and I$_2$ are displayed so as to be inclined with respect to the line of sight of the observer D. In order to display the virtual images I$_1$ and I$_2$ in an inclined manner as described above, the display device 110 is disposed to be inclined by the prescribed angle in a clockwise direction with respect to the reference light beam Lc, as shown in FIG. 6.

Further, also in the present embodiment, the projection optical system 140 included in the imaging position changer 150 is set so that the lower end of the main portion of the virtual image I$_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end I$_2$_u of the virtual image I$_2$ at the far visual position P2 is located at the position where the height of the upper end I$_2$_u from the road surface R is higher than the height of the lower end I$_2$_l from the road surface R when the height of the viewpoint position of the observer D with respect to the road surface R is the predetermined height and the depression angle is the predetermined angle.

Therefore, according to the present embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

[3-2. Advantageous Effect and the Like]

The head-up display 100 as an example of the head-up display according to the third embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, in the head-up display 100 as an example of the head-up display according to the third embodiment, a light beam corresponding to the centers of the virtual images $I_1$, $I_2$ is the reference light beam Lc. The imaging position changer 150 is configured to change the positions of the virtual images $I_1$ and $I_2$ by changing a distance in the direction of the reference light beam Lc of the display device 110 with respect to the projection optical system 140.

Therefore, according to the head-up display 100 of the third embodiment, it is possible to prevent an overlap of the virtual image $I_2$ at the far visual position P2 with the road surface R and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Fourth Embodiment

Next, a fourth embodiment will be described with reference to FIG. 7.

[4-1. Configuration]

Figure 7:
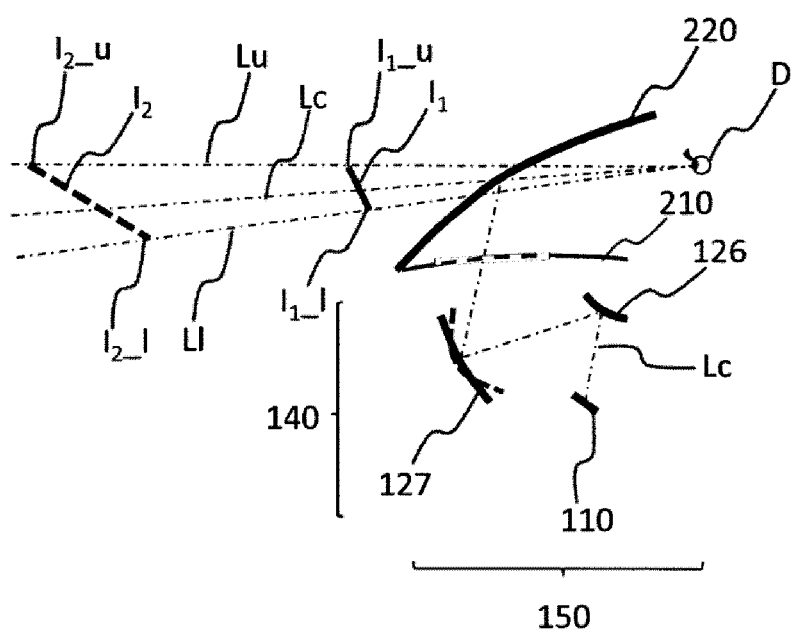
FIG. 7 is a schematic diagram showing a configuration of a head-up display according to a fourth embodiment.

FIG. 7 is a schematic diagram showing the configuration of the head-up display 100 according to the fourth embodiment. As shown in FIG. 7, in the head-up display 100 of the present embodiment, the projection optical system 140 included in the imaging position changer 150 includes a third mirror 127 provided in place of the first mirror 125 described in the third embodiment and the second mirror 126. The second mirror 126 is, for example, a free-form surface mirror.

Further, the third mirror 127 is a power variable optical element capable of changing its power. The third mirror 127 is, for example, a mirror having a variable curvature which includes a mirror surface formed of an electrostrictive element and is capable of changing a curvature of a curved surface in response to application of voltage. The third mirror 127 may be a mirror including a curved surface curvature of which is variable by another method.

In the present embodiment, the imaging position changer 150 is configured to change the positions of the virtual images $I_1$ and $I_2$ by changing the power of the third mirror 127 as a power variable optical element. In the present embodiment, the third mirror 127 is configured to change in shape between a shape with a large curvature as shown by a dotted line in FIG. 7 and a shape with a small curvature as shown by a solid line in FIG. 7. In a case where the third mirror 127 has the shape with the small curvature, the virtual image $I_1$ is formed at the near visual position P1, and in a case where the third mirror 127 has the shape with the large curvature, the virtual image $I_2$ is formed at the far visual position P2. As described above, in the present embodiment, the imaging position can be changed by changing the power of the third mirror 127.

Also the present embodiment is configured so that the virtual images $I_1$ and $I_2$ are displayed so as to be inclined with respect to the line of sight of the observer D. In order to display the virtual images $I_1$ and $I_2$ in an inclined manner as described above, the display device 110 is disposed to be inclined by the prescribed angle in the clockwise direction with respect to the reference light beam Lc, as shown in FIG. 7.

Further, also in the present embodiment, the projection optical system 140 included in the imaging position changer 150 is set so that the lower end of the main portion of the virtual image $I_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end $I_2\_u$ of the virtual image $I_2$ at the far visual position P2 is located at the position where the height of the upper end $I_2$ u from the road surface R is higher than the height of the lower end $I_2\_l$ from the road surface R when the height of the viewpoint position of the observer D with respect to the road surface R is the predetermined height and the depression angle is the predetermined angle.

Therefore, according to the present embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

[4-2. Advantageous Effect and the Like]

The head-up display 100 as an example of the head-up display according to the fourth embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, in the head-up display 100 as an example of the head-up display according to the fourth embodiment, the projection optical system 140 includes the third mirror 127 as the power variable optical element capable of changing its power, and the imaging position changer 150 is configured to change the positions of the virtual images $I_1$ and $I_2$ by changing the power of the third mirror 127 as the power variable optical element.

Therefore, according to the head-up display 100 of the fourth embodiment, it is possible to prevent an overlap of the virtual image $I_2$ at the far visual position P2 with the road surface R and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Fifth Embodiment

Next, a fifth embodiment will be described with reference to FIG. 8.

[5-1. Configuration]

Figure 8:
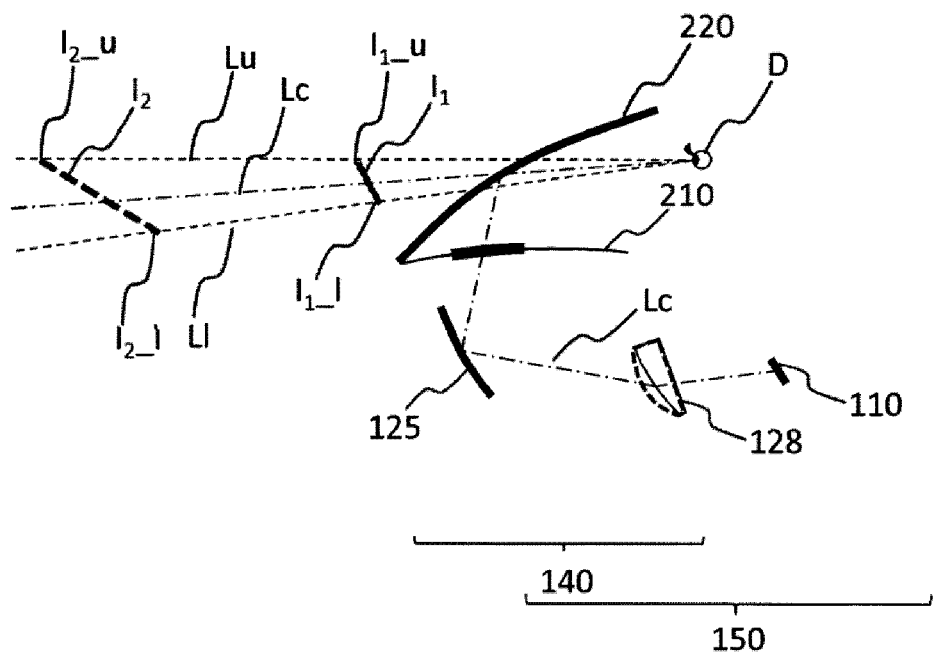
FIG. 8 is a schematic diagram showing a configuration of a head-up display according to a fifth embodiment.

FIG. 8 is a schematic diagram showing the configuration of the head-up display 100 according to the fifth embodiment. As shown in FIG. 8, in the head-up display 100 of the present embodiment, the projection optical system 140 included in the imaging position changer 150 includes a third lens 128 and the first mirror 125 as optical elements.

The third lens 128 is a power variable optical element capable of changing its power. The third lens 128 is, for example, a variable focus lens having a lens shape changeable in response to application of pressure with an electromagnetic actuator. A liquid lens, a liquid crystal lens, or the like may be used as the third lens 128.

In the present embodiment, the imaging position changer 150 is configured to change the positions of the virtual images $I_1$ and $I_2$ by changing the power of the third lens 128 as the power variable optical element. In the present embodiment, the third lens 128 is a negative lens, and is configured to change in shape between a shape with an increased lens thickness as shown by a dotted line in FIG. 8 and a shape with a decreased lens thickness as shown by a solid line in FIG. 8. In a case where the lens thickness of the third lens 128 increases, the power of the negative lens becomes stronger, and in a case where the lens thickness of the third lens 128 decreases, the power of the negative lens becomes weaker. Therefore, in a case where the lens thickness of the third lens 128 is small, the virtual image $I_1$ is formed at the near visual position P1, and in a case where the lens thickness of the third lens 128 is large, the virtual image $I_2$ is formed at the far visual position P2. As described above, in the present embodiment, the imaging position can be changed by changing the power of the third lens 128. However, in a case where the power of the third lens 128 is positive, when the lens thickness becomes large and the positive power becomes strong, the virtual image $I_2$ is formed at the far focus position P2, and when the lens thickness becomes small and the positive power becomes weak, the virtual image $I_1$ is formed at the near focus position P1.

Also the present embodiment is configured such that the virtual images $I_1$ and $I_2$ are displayed so as to be inclined with respect to the line of sight of the observer D. In order to display the virtual images $I_1$ and $I_2$ in an inclined manner as described above, the display device 110 is disposed to be inclined by the prescribed angle in the clockwise direction with respect to the reference light beam Lc, as shown in FIG. 8.

Further, also in the present embodiment, the projection optical system 140 included in the imaging position changer 150 is set so that the lower end of the main portion of the virtual image $I_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end $I_2\_u$ of the virtual image $I_2$ at the far visual position P2 is located at the position where the height of the upper end $I_2\_u$ from the road surface R is higher than the height of the lower end $I_2\_l$ from the road surface R when the height of the viewpoint position of the observer D with respect to the road surface R is the predetermined height and the depression angle is the predetermined angle.

Therefore, according to the present embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

[5-2. Advantageous Effect and the Like]

The head-up display 100 as an example of the head-up display according to the fifth embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, in the head-up display 100 as an example of the head-up display according to the fifth embodiment, the projection optical system 140 includes the third lens 128 as the power variable optical element capable of changing its power, and the imaging position changer 150 is configured to change the positions of the virtual images $I_1$ and $I_2$ by changing the power of the third lens 128 as the power variable optical element.

Therefore, according to the head-up display 100 of the fifth embodiment, it is possible to prevent an overlap of the virtual image $I_2$ at the far visual position P2 with the road surface R and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Sixth Embodiment

Next, a sixth embodiment will be described with reference to FIG. 9.

[6-1. Configuration]

Figure 9:
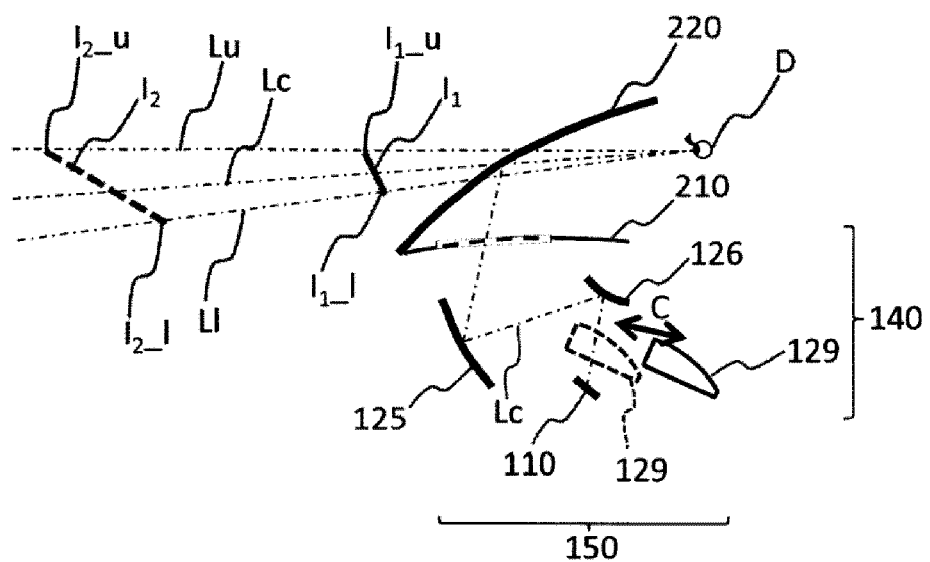
FIG. 9 is a schematic diagram showing a configuration of a head-up display according to a sixth embodiment.

FIG. 9 is a schematic diagram showing the configuration of the head-up display 100 according to the sixth embodiment. As shown in FIG. 9, in the head-up display 100 of the present embodiment, the projection optical system 140 included in the imaging position changer 150 includes the first mirror 125, the second mirror 126, and a fourth lens 129 configured to be inserted and removed in directions of arrows C shown in FIG. 9 as optical elements. The fourth lens 129 is, for example, a free-form surface lens.

In the present embodiment, the imaging position changer 150 is configured to change the positions of virtual images $I_1$ and $I_2$ by inserting and removing the fourth lens 129 in the directions of the arrows C. In the present embodiment, the fourth lens 129 is configured to be movable between a position deviating from an optical path from the display device 110 to the second lens 126 as shown by a solid line in FIG. 9 and a position disposed on the optical path from the display device 110 to the second lens 126 as shown by a dotted line in FIG. 9. In a case where the fourth lens 129 is at the position deviating from the optical path from the display device 110 to the second lens 126, the virtual image $I_1$ is formed at the near visual position P1, and in a case where the fourth lens 129 is at the position disposed on the optical path from the display device 110 to the second lens 126, the virtual image $I_2$ is formed at the far visual position P2. As described above, in the present embodiment, the imaging position can be changed by inserting and removing the fourth lens 129. Note that in a case where the power of the fourth lens 129 is opposite in polarity, the far-near relationship of the virtual image position is also reversed.

Also the present embodiment is configured so that the virtual images $I_1$ and $I_2$ are displayed so as to be inclined with respect to the line of sight of the observer D. In order to display the virtual images $I_1$ and $I_2$ in an inclined manner as described above, the display device 110 is disposed to be inclined by the prescribed angle in the clockwise direction with respect to the reference light beam Lc, as shown in FIG. 9.

Further, also in the present embodiment, the projection optical system 140 included in the imaging position changer 150 is set so that the lower end of the main portion of the virtual image $I_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end $I_2\_u$ of the virtual image $I_2$ at the far visual position P2 is located at the position where the height of the upper end $I_2\_u$ from the road surface R is higher than the height of the lower end $I_2\_l$ from the road surface R when the height of the viewpoint position of the observer D with respect to the road surface R is the predetermined height and the depression angle is the predetermined angle.

Therefore, according to the present embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

[6-2. Advantageous Effect and the Like]

The head-up display 100 as an example of the head-up display according to the sixth embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, in the head-up display 100 as an example of the head-up display according to the sixth embodiment, the projection optical system 140 includes the first mirror 125, the second mirror 126, and the fourth lens 129 as a plurality of optical elements. The imaging position changer 150 is configured to change the positions of the virtual images $I_1$ and $I_2$ by moving the fourth lens 129, which is at least any one of the plurality of optical elements, between a position intersecting the upper light beam and the lower light beam and a position not intersecting these light beams.

Therefore, according to the head-up display 100 of the sixth embodiment, it is possible to prevent an overlap of the virtual image $I_2$ at the far visual position P2 with the road surface R and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Seventh Embodiment

Next, a seventh embodiment will be described with reference to FIG. 10.

[7-1. Configuration]

Figure 10:
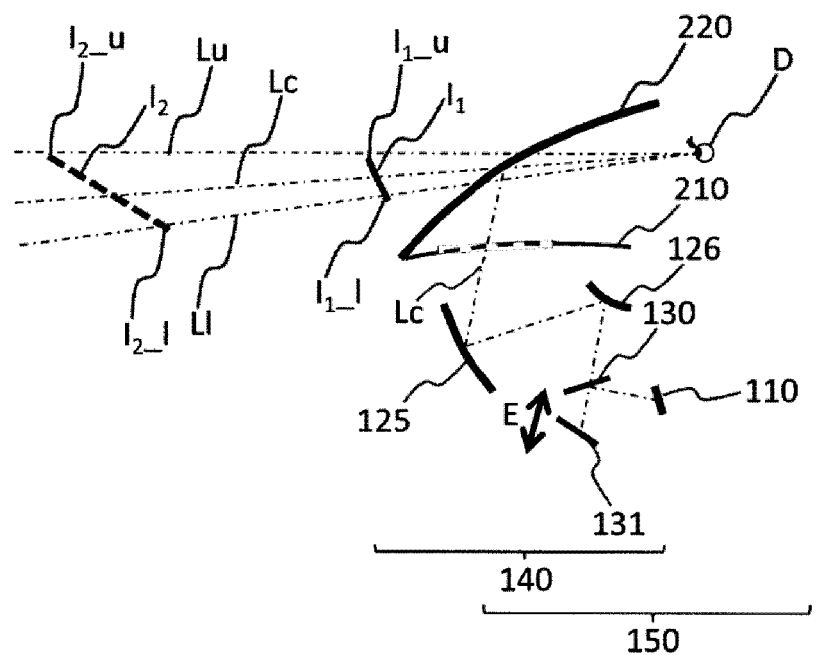
FIG. 10 is a schematic diagram showing a configuration of a head-up display according to a seventh embodiment.

FIG. 10 is a schematic diagram showing the configuration of the head-up display 100 according to the seventh embodiment. As shown in FIG. 10, in the head-up display 100 of the present embodiment, the projection optical system 140 included in the imaging position changer 150 includes the first mirror 125, the second mirror 126, a semi-transmissive reflective mirror 130, and a fourth mirror 131 configured to be movable in directions of arrows E shown in FIG. 10 along the reference light beam Lc as optical elements.

In the present embodiment, the imaging position changer 150 is configured to change the positions of virtual images $I_1$ and $I_2$ by moving the fourth mirror 131 in the directions of the arrows E. In the present embodiment, the fourth mirror 131 is configured to be movable between a position close to the semi-transmissive reflective mirror 130 and a position far from the semi-transmissive reflective mirror 130. In a case where the fourth mirror 131 is at the position close to the semi-transmissive reflective mirror 130, the virtual image $I_1$ is formed at the near visual position P1, and in a case where the fourth mirror 131 is at the position far from the semi-transmissive reflective mirror 130, the virtual image $I_2$ is formed at the far visual position P2. As described above, in the present embodiment, the imaging position can be changed by moving the fourth mirror 131. That is, the fourth mirror 131 is an optical element that changes an optical path length from an entrance surface to an exit surface of the projection optical system 140, and the imaging position changer 150 is configured to change the positions of the virtual images $I_1$ and $I_2$ by changing the position of the fourth mirror 131 for changing the optical path length of the projection optical system 140.

Also the present embodiment is configured so that the virtual images $I_1$ and $I_2$ are displayed so as to be inclined with respect to the line of sight of the observer D. In order to display the virtual images $I_1$ and $I_2$ in an inclined manner as described above, the display device 110 is disposed to be inclined by the prescribed angle in the clockwise direction with respect to the reference light beam Lc, as shown in FIG. 10.

Further, also in the present embodiment, the projection optical system 140 included in the imaging position changer 150 is set so that the lower end of the main portion of the virtual image $I_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end $I_2\_u$ of the virtual image $I_2$ at the far visual position P2 is located at the position where the height of the upper end $I_2\_u$ from the road surface R is higher than the height of the lower end $I_2\_l$ from the road surface R when the height of the viewpoint position of the observer D with respect to the road surface R is the predetermined height and the depression angle is the predetermined angle.

Therefore, according to the present embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort. Furthermore, since the virtual images $I_1$ and $I_2$ are inclined as described above, the projection optical system 140 of the head-up display 100 in the present embodiment can reduce a movement amount of the fourth mirror 131 and reduce a load on a mechanism for driving the fourth mirror 131.

[7-2. Advantageous Effect and the Like]

The head-up display 100 as an example of the head-up display according to the seventh embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, in the head-up display 100 as an example of the head-up display according to the seventh embodiment, the projection optical system 140 includes the first mirror 125, the second mirror 126, the semi-transmissive reflective mirror 130, and the fourth mirror 131 as a plurality of optical elements. The fourth mirror 131, which is at least any one of the plurality of optical elements, is an optical element that changes the optical path lengths from the display device 110 to the positions of the virtual images $I_1$ and $I_2$. The imaging position changer 150 is configured to change the positions of the virtual images $I_1$ and $I_2$ by changing the position of the fourth mirror 131 which is an optical element that changes the optical path length.

Therefore, according to the head-up display 100 of the seventh embodiment, it is possible to prevent an overlap of the virtual image $I_2$ at the far visual position P2 with the road surface R and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Eighth Embodiment

Next, an eighth embodiment will be described with reference to FIG. 11.
[8-1. Configuration]

Figure 11:
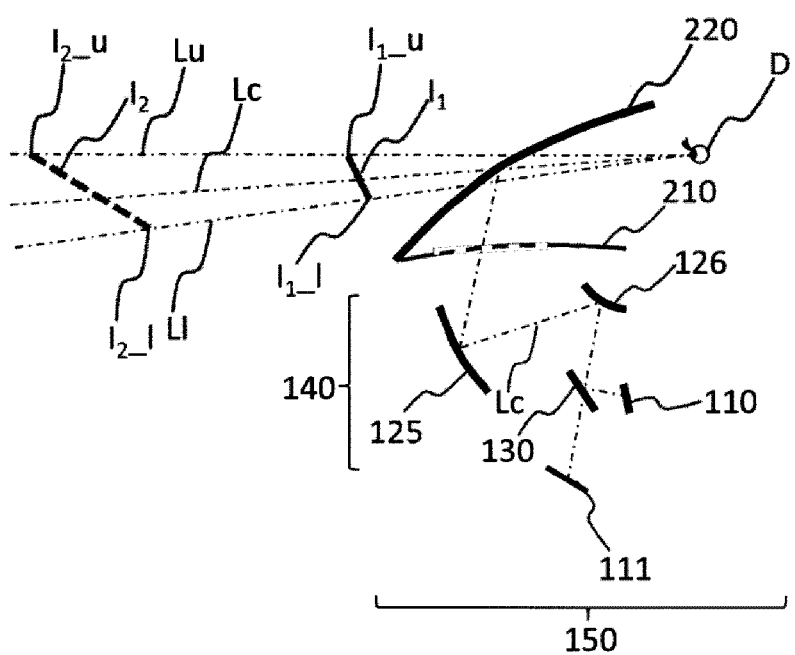
FIG. 11 is a schematic diagram showing a configuration of a head-up display according to an eighth embodiment.

FIG. 11 is a schematic diagram showing the configuration of the head-up display 100 according to the eighth embodiment. As shown in FIG. 11, in the head-up display 100 of the present embodiment, the projection optical system 140 included in the imaging position changer 150 includes the first mirror 125, the second mirror 126, and the semi-transmissive reflective mirror 130 as a plurality of optical elements. Further, the imaging position changer 150 includes two display devices which are the display device 110 and a display device 111. The display device 110 is disposed closer to the semi-transmissive reflective mirror 130 than the display device 111 is, and the display device 111 is disposed farther from the semi-transmissive reflective mirror 130 than the display device 110 is. That is, the display devices 110 and 111 are disposed at positions where optical path lengths from the display devices to the projection optical system 140 are different from each other.

In the present embodiment, the imaging position changer 150 is configured to change the positions of virtual images $I_1$ and $I_2$ by switching a display device to display an image between the display device 110 and the display device 111. In the present embodiment, in a case where the image is displayed by the display device 110, the virtual image $I_1$ is formed at the near visual position P1, and in a case where the image is displayed by the display device 111, the virtual image $I_2$ is formed at the far visual position P2. As described above, in the present embodiment, the imaging position can be changed by switching the display device to display the image between the display device 110 and the display device 111.

Note that, although the second mirror 126 is used in the present embodiment, a similar effect can be obtained by using a lens such as the second lens 124 as in the second embodiment shown in FIG. 5, in place of the second mirror 126.

Also the present embodiment is configured so that the virtual images $I_1$ and $I_2$ are displayed so as to be inclined with respect to the line of sight of the observer D. In order to display the virtual images $I_1$ and $I_2$ in an inclined manner as described above, the display devices 110 and 111 are disposed to be inclined by prescribed angles in the counterclockwise and clockwise directions with respect to the reference light beam Lc, respectively, as shown in FIG. 11.

Further, also in the present embodiment, the projection optical system 140 included in the imaging position changer 150 is set so that the lower end of the main portion of the virtual image $I_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end $I_2\_u$ of the virtual image $I_2$ at the far visual position P2 is located at the position where the height of the upper end $I_2\_u$ from the road surface R is higher than the height of the lower end $I_2\_l$ from the road surface R when the height of the viewpoint position of the observer D with respect to the road surface R is the predetermined height and the depression angle is the predetermined angle.

Therefore, according to the present embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

[8-2. Advantageous Effect and the Like]

The head-up display 100 as an example of the head-up display according to the eighth embodiment is a head-up display for allowing the observer D to visually perceive the virtual images $I_1$ and $I_2$. The virtual images $I_1$ and $I_2$ are inclined with respect to the line of sight of the observer D. The head-up display 100 includes the imaging position changer 150 that includes the display device 110 as an example of a display device and the projection optical system 140, and is configured to change the position of the virtual image between the far visual position P2 far from the observer D and the near visual position P1 close to the observer D. The imaging position changer 150 is configured to, when the height of the viewpoint position of the observer D with respect to the road surface R that is a traveling surface of the vehicle 200 as a moving object is the predetermined height, allow the lower end of the main portion of the virtual image $I_2$ at the far visual position P2 to be located at the position equal to or higher than the position of the road surface R, and allow the upper end $I_2\_u$ of the virtual image $I_2$ at the far visual position P2 to be located at the position where the height of the upper end $I_2\_u$ from the road surface R is higher than the height of the lower end $I_2\_l$ from the road surface R.

Further, the head-up display 100 as an example of the head-up display according to the eighth embodiment includes the two display devices which are the display device 110 and the display device 111, as display devices, and the two display devices 110 and 111 are disposed at positions where optical paths from the display devices 110 and 111 to the positions of the virtual images $I_1$ and $I_2$ are different from each other. Further, the imaging position changer 150 is configured to change the positions of virtual images $I_1$ and $I_2$ by switching the display to display the image between the display devices 110 and 111.

Therefore, according to the head-up display 100 of the eighth embodiment, it is possible to prevent an overlap of the virtual image $I_2$ at the far visual position P2 with the road surface R and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Ninth Embodiment

As described above, the first to eighth embodiments have been described as examples of the technique disclosed in the present application. However, the technique in the present disclosure is not limited to these, and is also applicable to embodiments made by modification, replacement, addition, omission, and the like. Further, new embodiments can be made by combining any of components described in the first to eighth embodiments.

Figure 12:
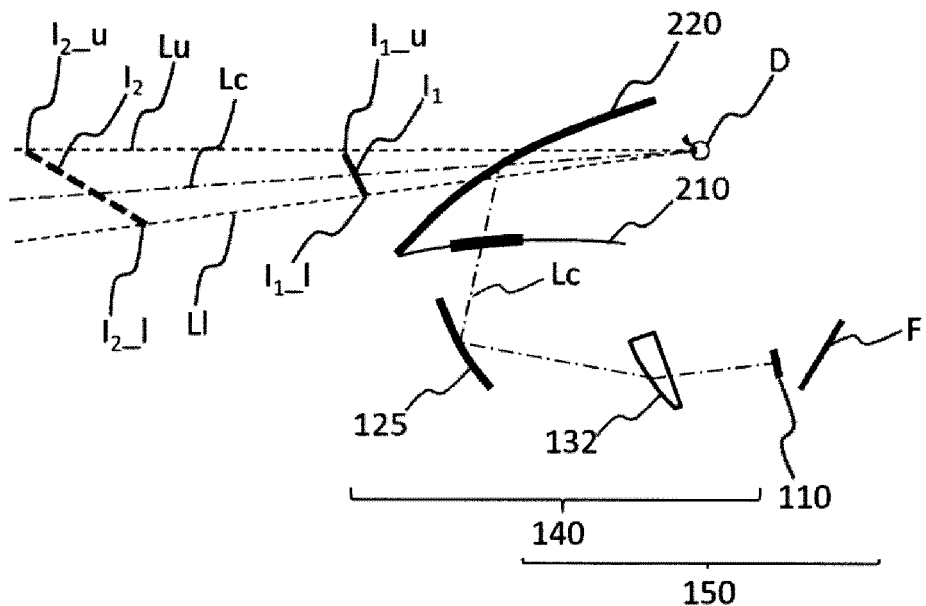
FIG. 12 is a schematic diagram showing a configuration of a head-up display according to a ninth embodiment.

FIG. 12 is a schematic diagram showing the configuration of the head-up display 100 according to a ninth embodiment. In the first to eighth embodiments, explanations are made to aspects in which the display devices 110 and 111 are inclined with respect to the reference light beam Lc in order to incline the virtual images $I_1$ and $I_2$. However, the head-up display 100 of the present disclosure is not limited to such aspects.

For example, in the head-up display 100 according to the present embodiment shown in FIG. 12, a display surface of the display device 110 is disposed perpendicular to the reference light beam Lc. A focal plane F is inclined by a lens 132 having power made stronger or weaker in an upward or downward direction, or a lens 132 having power varying continuously in the upward and downward directions. This configuration also can incline the virtual images $I_1$ and $I_2$. Note that the focal plane F is a combined focal plane of the windshield 220 and a virtual image system.

Further, in a case where a mirror is used as the optical element, the focal plane F can be inclined by the mirror having power varying continuously in upward and downward directions. Thereby, the virtual images $I_1$ and $I_2$ can be inclined.

As described above, in the head-up display 100 according to the present embodiment, the projection optical system 140 includes lenses or mirrors as a plurality of optical elements, and a lens or a mirror which is at least any one of the plurality of optical elements has at least any one of an entrance surface and an exit surface inclined with respect to the reference light beam Lc when a light beam corresponding to the centers of the virtual images $I_1$ and $I_2$ is the reference light beam Lc.

Also in the present embodiment, the projection optical system 140 included in the imaging position changer 150 is set so that the lower end of the main portion of the virtual image I₂ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end I₂_u of the virtual image I₂ at the far visual position P2 is located at the position where the height of the upper end I₂_u from the road surface R is higher than the height of the lower end I₂_l from the road surface R when the height of the viewpoint position of the observer D with respect to the road surface R is the predetermined height and the depression angle is the predetermined angle.

Therefore, according to the present embodiment, it is possible to prevent an overlap of the virtual image I₂ at the far visual position P2 with the road surface R, and prevent the observer D from feeling a sense of discomfort. Further, according to the present embodiment, the upper end I₂_u of the virtual image I₂ does not become lower than the lower end I₂_l, and it is possible to prevent the observer D from feeling a sense of discomfort.

Tenth Embodiment

Next, a tenth embodiment will be described with reference to FIGS. 13 to 17B.

[10-1. Configuration]

Figure 13:
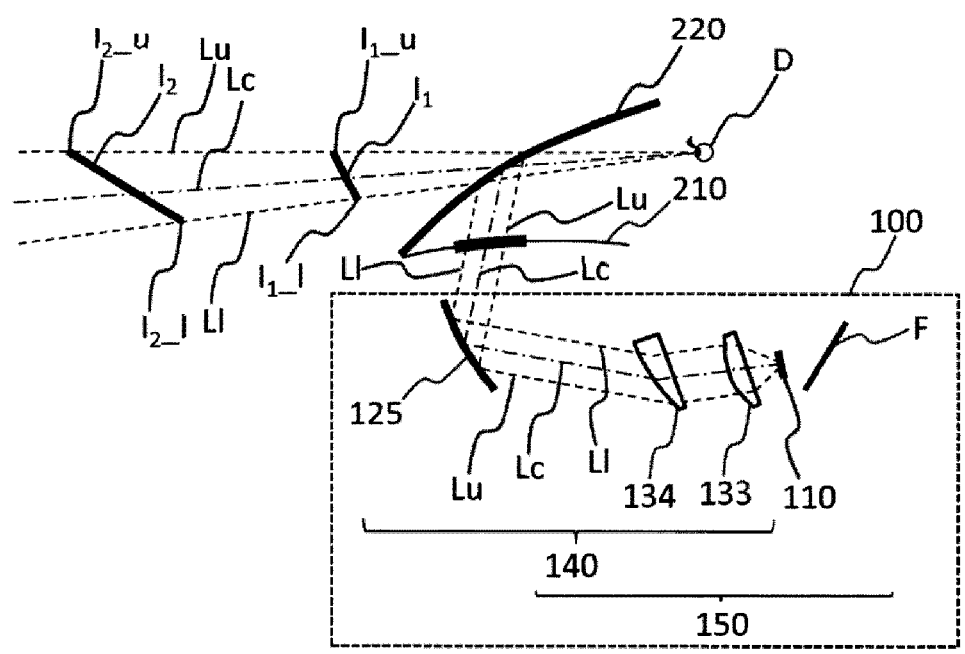
FIG. 13 is a schematic diagram showing a configuration of a head-up display according to a tenth embodiment.

FIG. 13 is a schematic diagram showing the configuration of the head-up display 100 according to the tenth embodiment. As shown in FIG. 13, in the head-up display 100 according to the present embodiment, the projection optical system 140 included in the imaging position changer 150 includes the first mirror 125, a first lens 133, and a second lens 134 as optical elements. Further, the imaging position changer 150 includes the display device 110.

The first lens 133 is, for example, a free-form surface lens, and has positive power. In the first lens 133, positive power on a side transmitting the lower light beam L1 reaching the lower sides of the virtual images I₁ and I₂ is made weaker, and positive power on a side transmitting the upper light beam Lu reaching the upper sides of the virtual images I₁ and I₂ is made stronger.

The second lens 134 is, for example, a free-form surface lens, and has negative power. In the second lens 134, negative power on a side transmitting the lower light beam L1 reaching the lower sides of the virtual images I₁ and I₂ is made stronger, and negative power on a side transmitting the upper light beam Lu reaching the upper sides of the virtual images I₁ and I₂ is made weaker.

Figure 14:
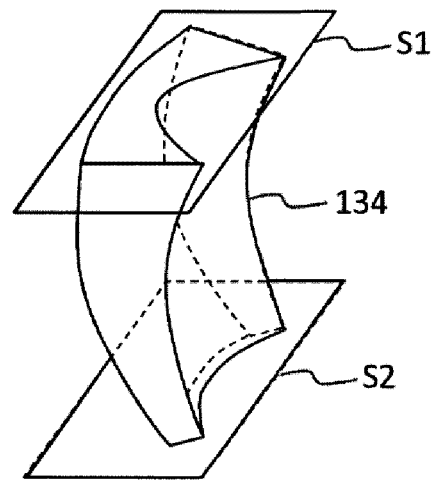
FIG. 14 is a perspective view of a second lens according to the tenth embodiment.

FIG. 14 is a perspective view of the second lens 134. As shown in FIG. 14, a cross section A represents a cross section corresponding to a plane of intersection between a plane S1 and the side of the second lens 134 transmitting the lower light beam L1 reaching the lower sides of the virtual images I₁ and I₂. Further, a cross section B represents a cross section corresponding to a plane of intersection between a plane S2 and the side of the second lens 134 transmitting the upper light beam Lu reaching the upper sides of the virtual images I₁ and I₂. Here, the planes S1 and S2 are planes parallel to each other and are planes parallel to the reference light beam Lc.

Figure 15A:
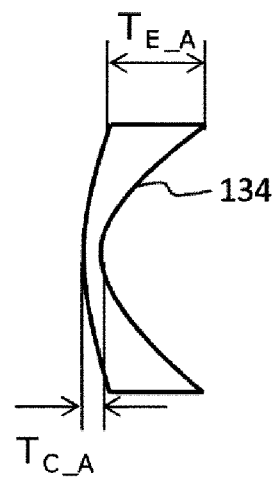
FIG. 15A is a diagram showing a cross section A of the second lens according to the tenth embodiment.
Figure 15B:
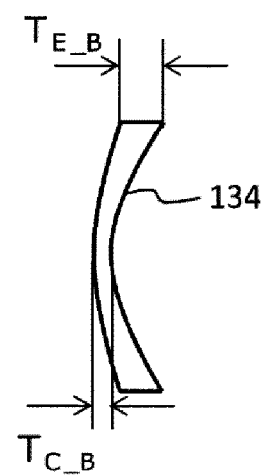
FIG. 15B is a diagram showing a cross section B of the second lens according to the tenth embodiment.

FIG. 15A is a diagram showing the cross section A of the second lens 134, and FIG. 15B is a diagram showing the cross section B of the second lens 134. As can be seen by comparing FIG. 15A and FIG. 15B, in the second lens 134, a thickness deviation ratio at the cross section A is made relatively larger than a thickness deviation ratio at the cross section B. Here, the thickness deviation ratio is a ratio of a thickness at a lens peripheral portion to a thickness at a lens near central portion, and is equal to or larger than one.

In FIGS. 15A and 15B, the thickness at the lens near central portion is represented by "$T_{C\_A}$" or "$T_{C\_B}$", and the thickness of the lens peripheral portion is represented by "$T_{E\_A}$" or "$T_{E\_B}$". However, the thickness at the lens peripheral portion is defined as the larger of thicknesses at edge portions on both sides of the lens, and the thickness at the lens near central portion is defined as a thickness at a thinnest portion of the lens. Further, it is desirable to define the edge portions by regions transmitting light beams (excluding an obvious holding margin).

The thickness deviation ratio $R_{ut\_A}$ at the cross section A shown in FIG. 15A is expressed by the following formula:

$$R_{ut\_A} = \frac{T_{E\_A}}{T_{C\_A}} \qquad \text{(Formula 1)}$$

Further, the thickness deviation ratio $R_{ut\_B}$ at the cross section B shown in FIG. 15B is expressed by the following formula:

$$R_{ut\_B} = \frac{T_{E\_B}}{T_{C\_B}} \qquad \text{(Formula 2)}$$

A relationship between the thickness deviation ratio $R_{ut\_A}$ at the cross section A and the thickness deviation ratio $R_{ut\_B}$ at the cross section B is expressed by the following formula:

$$R_{ut\_A} > R_{ut\_B} \qquad \text{(Formula 3)}$$

In the second lens 134 having negative power, the fact that the thickness deviation ratio $R_{ut\_A}$ on the cross section A side is larger than the thickness deviation ratio $R_{ut\_B}$ on the cross section B side means that the negative power is stronger on the cross section A side than on the cross section B side. The cross section A side transmitting the lower light beam L1 reaching the lower sides of the virtual images I₁ and I₂ has the strong negative power and thus has a short focal length, and the focal plane F shown in FIG. 13 is located on a side far from the cross section A side. Further, the cross section B side transmitting the upper light beam Lu reaching the upper sides of the virtual images I₁ and I₂ has weak negative power and thus has a long focal length, and the focal plane F shown in FIG. 13 is located on a side close to the cross section B side.

Figure 16:
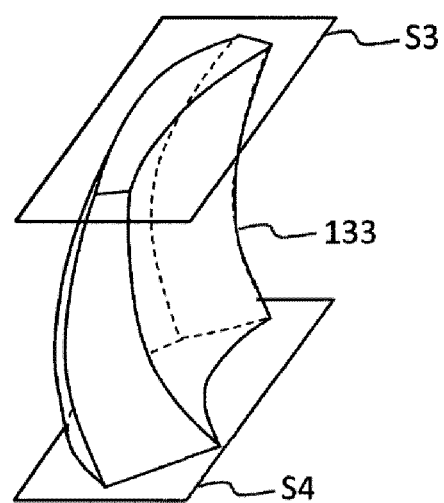
FIG. 16 is a perspective view of a first lens according to the tenth embodiment.

FIG. 16 is a perspective view of the first lens 133. As shown in FIG. 16, a cross section C represents a cross section corresponding to a plane of intersection between a plane S3 and the side of the first lens 133 transmitting the lower light beam L1 reaching the lower sides of the virtual images I₁ and I₂. Further, a cross section D represents a cross section corresponding to a plane of intersection between a plane S4 and the side of the first lens 133 transmitting the upper light beam Lu reaching the upper sides of the virtual images I₁ and I₂. Here, the planes S3 and S4 are planes parallel to each other and are planes parallel to the reference light beam Lc.

Figure 17A:
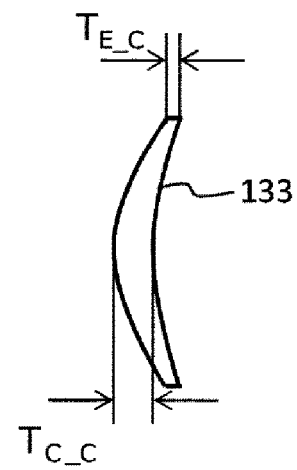
FIG. 17A is a diagram showing a cross section C of the first lens according to the tenth embodiment.
Figure 17B:
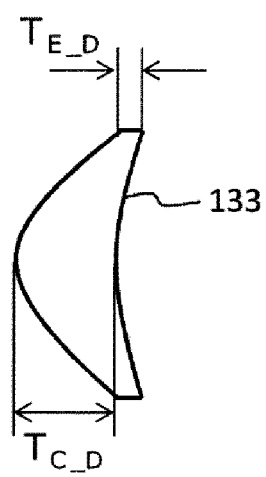
FIG. 17B is a diagram showing a cross section D of the first lens according to the tenth embodiment.

FIG. 17A is a diagram showing the cross section C of the first lens 133, and FIG. 17B is a diagram showing the cross section D of the first lens 133. As shown in FIG. 17A, in the first lens 133, a thickness deviation ratio at the cross section D is made relatively larger than a thickness deviation ratio at the cross section C. Here, the thickness deviation ratio is a ratio of a thickness at a lens peripheral portion to a thickness at a lens near central portion, and is equal to or larger than one.

In FIGS. 17A and 17B, the thickness at the lens near central portion is represented by "$T_{C\_C}$" or "$T_{C\_D}$", and the thickness of the lens peripheral portion is represented by "$T_{E\_C}$" or "$T_{E\_D}$". However, the thickness of the lens peripheral portion is defined as the smaller of thicknesses at edge portions on both sides of the lens, and the thickness at the lens near central portion is defined as a thickness at a thickest portion of the lens. Further, it is desirable to define the edge portions by regions transmitting light beams (excluding an obvious holding margin).

The thickness deviation ratio $R_{ut\_C}$ at the cross section C shown in FIG. 17A is expressed by the following formula:

$$R_{ut\_C} = \frac{T_{E\_C}}{T_{C\_C}} \quad \text{(Formula 4)}$$

Further, the thickness deviation ratio $R_{ut\_D}$ at the cross section D shown in FIG. 17B is expressed by the following formula:

$$R_{ut\_D} = \frac{T_{E\_D}}{T_{C\_D}} \quad \text{(Formula 5)}$$

A relationship between the thickness deviation ratio $R_{ut\_C}$ at the cross section C and the thickness deviation ratio $R_{ut\_D}$ at the cross section D is expressed by the following formula:

$$R_{ut\_C} > R_{ut\_D} \quad \text{(Formula 6)}$$

In the first lens 133 having positive power, the fact that the thickness deviation ratio $R_{ut\_C}$ on the cross section C side is larger than the thickness deviation ratio $R_{ut\_D}$ on the cross section D side means that the negative power is weaker on the cross section C side than on the cross section D side. The cross section C side transmitting the lower light beam L1 reaching the lower sides of the virtual images $I_1$ and $I_2$ has the weak positive power and thus has a long focal length, and the focal plane F shown in FIG. 13 is located on a side far from the cross section C side. Further, the cross section D side transmitting the upper light beam Lu reaching the upper sides of the virtual images $I_1$ and $I_2$ has the strong positive power and thus has a short focal length, and the focal plane F is located on the side close to the cross section D side.

In the present embodiment, as described above, the negative power of the second lens 134 is varied in the upward and downward directions and the positive power of the first lens 133 is varied in the upward and downward directions. Thereby the focal plane F can be inclined and thus the virtual images $I_1$ and $I_2$ can be inclined.

Note that, in the present embodiment, in order to allow movement of the imaging position of the virtual image between the near visual position P1 having a short visual distance which is the imaging position of the virtual image $I_1$ and the far visual position P2 having a long visual distance which is the imaging position of the virtual image $I_2$, the second lens 134 of the projection optical system 140 included in the imaging position changer 150 is preferably configured to be movable as in the first embodiment.

[10-2. Advantageous Effect and the Like]

As described above, in the head-up display 100 according to the tenth embodiment, the negative power of the second lens 134 is varied in the upward and downward directions, and the positive power of the first lens 133 is varied in the upward and downward directions. Thereby, the focal plane F is inclined and the virtual images $I_1$ and $I_2$ are inclined. Further, also in the tenth embodiment, the projection optical system 140 included in the imaging position changer 150 is set so that the lower end of the main portion of the virtual image $I_2$ at the far visual position P2 is located at the position equal to or higher than the position of the road surface R when the height of the viewpoint position of the observer D with respect to the road surface R is the predetermined height and the depression angle is the predetermined angle. Further, similarly, the projection optical system 140 is set so that the upper end $I_2\_u$ of the virtual image $I_2$ at the far visual position P2 is located at the position where the height of the upper end $I_2\_u$ from the road surface R is higher than the height of the lower end $I_2\_l$ from the road surface R when the height of the viewpoint position of the observer D with respect to the road surface R is the predetermined height and the depression angle is the predetermined angle. Therefore, according to the tenth embodiment, it is possible to prevent an overlap of the virtual image $I_2$ at the far visual position P2 with the road surface R, and prevent the observer D from feeling a sense of discomfort. Further, according to the present embodiment, the upper end $I_2\_u$ of the virtual image $I_2$ does not become lower than the lower end $I_2\_l$, and it is possible to prevent the observer D from feeling a sense of discomfort.

Note that, the first to tenth embodiments are configured so that, even in a case where a posture of the vehicle is changed so that the center of gravity of the vehicle 200 moves forward and the vehicle 200 leans forward, the upper end $I_2\_u$ of the virtual image $I_2$ at the far visual position P2 is located at the position where the height of the upper end $I_2\_u$ from the road surface R is higher than the height of the lower end $I_2\_l$ from the road surface R.

Further, the head-up display 100, which is disposed below the dashboard 210 in the first to tenth embodiments, may be disposed above the dashboard 210.

Further, the above-described embodiments are used for exemplifying the technique in the present disclosure, and therefore various modification, replacement, addition, omission, and the like can be made to the embodiments within the scope of claims or a scope equivalent to the claims.

Outline of Embodiment (1) The head-up display of the present disclosure is a head-up display installed on a moving object, such as a vehicle, for displaying an image as a virtual image to an observer. The head-up display includes an imaging position changer that includes a display device for displaying the image and a projection optical system for enlarging and projecting the image. The imaging position changer is configured to change a position of the virtual image between a far visual position far from the observer and a near visual position close to the observer. The imaging position changer is configured to incline the virtual image at the far visual position by a second inclination angle with respect to a perpendicular plane to a reference light beam reaching a center of a viewpoint region in which a viewpoint of the observer is located, to move an upper end thereof in a forward direction of the moving object, and incline the virtual image at the near visual position by a first inclination angle smaller than the second inclination angle with respect to the perpendicular plane to the reference light beam, to move the upper end in the forward direction of the moving object.

Therefore, according to the head-up display of the present disclosure, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(2) In the head-up display of (1), the projection optical system includes at least one optical element. The at least one optical element has a change in power from a side transmitting a light beam reaching a lower side of the virtual image to a side transmitting a light beam reaching an upper side of the virtual image to give the second inclination angle allowing a lower end of the virtual image at the far visual position to be positioned at an upper position which is equal to or higher than a position of a road surface in front of the moving object. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(3) In the head-up display of (1), the projection optical system includes at least one optical element. The at least one optical element has a change in power from a side transmitting a light beam reaching a lower side of the virtual image to a side transmitting a light beam reaching an upper side of the virtual image to give the second inclination angle allowing a lower end of the virtual image at the far visual position to be positioned at an upper position which is equal to or higher than a position of a road surface in front of the moving object even when a posture of the moving object is changed so that the moving object is inclined. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(4) In the head-up display of (1), the projection optical system includes a plurality of optical elements. The imaging position changer is configured to change the position of the virtual image by changing a distance in a direction of the reference light beam between at least any one of the plurality of optical elements and another or others of the plurality of optical elements. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(5) In the head-up display of (1), the imaging position changer is configured to change the position of the virtual image by changing a distance in a direction of the reference light beam between the display device and the projection optical system. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(6) In the head-up display of (1), the projection optical system includes at least one optical element. The imaging position changer is configured to change the position of the virtual image by moving the at least one optical element between a position that intersects an optical path from the display device and a position that does not intersect the optical path. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(7) In the head-up display of (1), the projection optical system includes a plurality of optical elements. At least any one of the plurality of optical elements is an optical element for changing an optical path length of the projection optical system. The imaging position changer is configured to change the position of the virtual image by changing a position of the optical element for changing the optical path length. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(8) In the head-up display of (1), the display device includes two display devices. The two display devices are disposed at positions where optical path lengths from the display devices to the projection optical system are different from each other. The imaging position changer is configured to change the position of the virtual image by switching a display device to display the image, between the display devices. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(9) In the head-up display of (1), the projection optical system includes a power variable optical element capable of changing power. The imaging position changer is configured to change the position of the virtual image by changing the power of the power variable optical element. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(10) In the head-up display according to any one of (1) to (9), a light beam corresponding to the center of the virtual image is the reference light beam. The display device has a displayed image that is inclined with respect to the reference light beam. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(11) In the head-up display according to any one of (1) to (10), the projection optical system includes at least one optical element. The at least one optical element has power varying in upward and downward directions, and has a focal plane inclined with respect to the reference light beam. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(12) In the head-up display according to any one of (1) to (11), the projection optical system includes at least one optical element. The at least one optical element has negative power, and in the at least one optical element, negative power on a side transmitting a light beam reaching a lower side of the virtual image is made stronger, and negative power on a side transmitting a light beam reaching an upper side of the virtual image is made weaker. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(13) In the head-up display according to any of (1) to (12), the projection optical system includes at least one optical element. The at least one optical element has positive power, and, in the at least one optical element, positive power on a side transmitting a light beam reaching a lower side of the virtual image is made weaker and positive power on a side transmitting a light beam reaching an upper side of the virtual image is made stronger. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(14) In the head-up display according to any of (1) to (13), the projection optical system includes at least one optical element. The at least one optical element has negative power and has a thickness deviation ratio which is defined as a ratio of a thickness at a lens peripheral portion to a thickness at a lens near central portion and is equal to or larger one. The thickness deviation ratio on a side transmitting a light beam reaching a lower side of the virtual image is larger than the thickness deviation ratio on a side transmitting a light beam reaching an upper side of the virtual image. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

(15) In the head-up display according to any one of (1) to (14), the projection optical system includes at least one optical element. The at least one optical element has positive power and has a thickness deviation ratio which is a ratio of a thickness at a lens peripheral portion to a thickness at a lens near central portion. The thickness deviation ratio on a side transmitting a light beam reaching an upper side of the virtual image is larger than the thickness deviation ratio on a side transmitting a light beam reaching a lower side of the virtual image. Therefore, it is possible to prevent an overlap of the virtual image at the far visual position with the road surface and prevent the observer from feeling a sense of discomfort. Further, according to the head-up display of the present disclosure, the upper end of the virtual image does not become lower than the lower end, and it is possible to prevent the observer from feeling a sense of discomfort.

The present disclosure can be applied to a display device such as a liquid crystal display, and a head-up display using a projection optical system such as a free-form surface lens or a free-form surface mirror. Specifically, the present disclosure is applicable to a head-up display for a vehicle and the like.

What is claimed is:

1. A head-up display installed on a moving object for displaying an image as a virtual image to an observer, the head-up display comprising:
    an imaging position changer comprising a single display device configured to display the image and a single projection optical system for enlarging and projecting the image displayed on the display device, and the imaging position changer being configured to change a position of the virtual image between a near visual position close to the observer and a far visual position far from the observer, wherein:
    the imaging position changer is configured to
        incline the virtual image at the near visual position by a first inclination angle with respect to a perpendicular plane to a reference light beam reaching a center of a viewpoint region in which a viewpoint of the observer is located, to move an upper end thereof in a forward direction of the moving object, and
        incline the virtual image at the far visual position by a second inclination angle larger than the first inclination angle with respect to the perpendicular plane to the reference light beam, to move the upper end in the forward direction of the moving object;
    the single projection optical system includes a first free-form surface lens;
    the first free-form surface lens has negative power, and, in the first free-form surface lens, negative power on a side transmitting the light beam reaching a lower side of the virtual image is made stronger and negative power on a side transmitting a light beam reaching an upper side of the virtual image is made weaker; and
    the negative power on the side transmitting the light beam reaching the lower side of the virtual image, of the first free-form surface lens inclines, when the imaging position changer changes the position of the virtual image to the far visual position, the virtual image by the second inclination angle so that a lower end of the virtual image is positioned at an upper position which is equal to or higher than a position of a road surface in front of the moving object.

2. The head-up display according to claim 1, wherein the imaging position changer is configured to change the position of the virtual image from the near visual position to the far visual position by decreasing an optical path length from the display device to the first free-form surface lens by moving the display device or the first free-form lens.

3. The head-up display according to claim 2, wherein the display device has a displayed image that is inclined with respect to the perpendicular plane to the reference light beam so that a part for emitting the light beam reaching the upper side of the virtual image is farther from the single projection optical system than is a part for emitting the light beam reaching the lower side of the virtual image.

4. The head-up display according to claim 2, wherein
the display device is disposed perpendicular to the reference light beam,
a combined focal plane of a windshield of the moving object and the single projection optical system is on an opposite side of the display device from the single projection optical system, and
a first end of the combined focal plane corresponding to the upper end of the virtual image is closer to the display device than is a second end of the combined focal plane corresponding to a lower end of the virtual image.

5. The head-up display according to claim 1, wherein
the single projection optical system includes a second free-form surface lens at a position disposed on an optical path between the display device and the first free-form surface lens, and
the second free-form surface lens has positive power, and, in the second free-form surface lens, positive power on a side transmitting the light beam reaching the lower side of the virtual image is made weaker and positive power on a side transmitting the light beam reaching the upper side of the virtual image is made stronger.

6. The head-up display according to claim 5, wherein
the second free-form surface lens has a thickness deviation ratio which is a ratio of a thickness at a lens peripheral portion to a thickness at a lens near central portion, and
the thickness deviation ratio on the side transmitting the light beam reaching the upper side of the virtual image is larger than the thickness deviation ratio on the side transmitting the light beam reaching the lower side of the virtual image.

7. The head-up display according to claim 1, wherein
the first free-form surface lens has power varying continuously from the side transmitting the light beam reaching the lower side of the virtual image to the side transmitting the light beam reaching the upper side of the virtual image, of the first free-form surface lens.

8. The head-up display according to claim 1, wherein the imaging position changer is configured to change the position of the virtual image by changing a distance in a direction of the reference light beam between the display device and the at least one optical element.

9. The head-up display according to claim 1, wherein
the first free-form surface lens has a thickness deviation ratio which is defined as a ratio of a thickness at a lens peripheral portion to a thickness at a lens near central portion and is equal to or larger than one, and
the thickness deviation ratio on the side transmitting the light beam reaching the lower side of the virtual image is larger than the thickness deviation ratio on the side transmitting the light beam reaching the upper side of the virtual image.

* * * * *